United States Patent [19]

Thomas et al.

[11] Patent Number: 5,154,846

[45] Date of Patent: * Oct. 13, 1992

[54] FLUORINATED BUTYLENE OXIDE BASED REFRIGERANT LUBRICANTS

[75] Inventors: Raymond H. P. Thomas; David Nalewajek; Hang T. Pham; David P. Wilson, all of Erie County, N.Y.

[73] Assignee: Allied-Signal Inc., Morris Township, Morris County, N.J.

[ * ] Notice: The portion of the term of this patent subsequent to Dec. 4, 2007 has been disclaimed.

[21] Appl. No.: 614,549

[22] Filed: Nov. 16, 1990

Related U.S. Application Data

[63] Continuation-in-part of Ser. No. 290,120, Dec. 27, 1988, Pat. No. 4,975,212.

[51] Int. Cl.$^5$ .................... C10M 105/52; C07C 43/12
[52] U.S. Cl. .................... 252/68; 252/52 A; 252/54; 252/67
[58] Field of Search .................... 252/54, 52 A, 68

[56] References Cited

U.S. PATENT DOCUMENTS

| | | | |
|---|---|---|---|
| 577,327 | 6/1959 | Cowen et al. | 568/615 |
| 2,723,999 | 11/1955 | Cowen et al. | 568/615 |
| 3,483,129 | 12/1969 | Dolle et al. | 252/49.9 |
| 4,052,277 | 10/1977 | Martini | 204/158 R |
| 4,079,084 | 3/1978 | Houghton | 260/615 BF |
| 4,118,398 | 10/1978 | Martini | 260/615 BF |
| 4,267,064 | 5/1981 | Sasaki et al. | 252/52 A |
| 4,359,394 | 11/1982 | Gainer et al. | 252/54 |
| 4,379,768 | 4/1983 | Yamabe et al. | 260/544 F |
| 4,428,854 | 1/1984 | Enjo et al. | 252/69 |
| 4,431,557 | 2/1984 | Shimizu et al. | 252/52 A |
| 4,443,349 | 4/1984 | Synder, Jr. et al. | 252/49.9 |
| 4,454,052 | 7/1984 | Shoji et al. | 252/68 |
| 4,497,720 | 2/1985 | Moriga et al. | 252/52 A |
| 4,675,452 | 6/1987 | Lagow et al. | 568/601 |
| 4,699,969 | 10/1987 | Re et al. | 528/70 |
| 4,755,316 | 7/1988 | Magid et al. | 252/68 |
| 4,758,366 | 7/1988 | Parekh | 252/68 |
| 4,827,042 | 5/1989 | Lagow et al. | 568/603 |
| 4,898,991 | 2/1990 | Huang | 568/615 |
| 4,931,199 | 6/1990 | Bierschenk et al. | 252/68 |
| 4,944,890 | 7/1990 | Deeb et al. | 252/54 |
| 4,946,611 | 8/1990 | Kaneko | 252/49.6 |
| 4,948,525 | 8/1990 | Sasaki et al. | 252/52 A |
| 4,975,212 | 12/1990 | Thomas et al. | 252/54 |

FOREIGN PATENT DOCUMENTS

| | | |
|---|---|---|
| 2750980 | 5/1979 | Fed. Rep. of Germany . |
| 51795 | 3/1982 | Japan . |
| 96684 | 5/1985 | Japan . |
| 146996 | 6/1987 | Japan . |
| 118598 | 5/1989 | Japan . |
| 8702992 | 5/1987 | PCT Int'l Appl. . |
| 8702993 | 5/1987 | PCT Int'l Appl. . |
| 8800963 | 2/1988 | PCT Int'l Appl. . |
| 8901828 | 3/1989 | PCT Int'l Appl. . |
| 1087283 | 10/1967 | United Kingdom . |
| 1354138 | 5/1974 | United Kingdom . |

OTHER PUBLICATIONS

"Lubricants in Refrigerant Systems", Chapter 32, pp. 32.1–32.24, 1980 Systems Handbook.

"Refrigerants", pp. 13–14, Fluorocarbon Refrigerant Handbook, by R. C. Downing.

Kruse, H. H., Schroeder, M., "Fundamentals of Lubrication in Refrigerating Systems and Heat Pumps", pp. 763–783.

Spauschus, H. O., "Evaluation of Lubricants for Refrigeration and Air-Conditioning Compressors".

Sanvordenker, Keshav S., Larmine, M. W., "A Review of Synthetic Oils for Refrigeration Use".

"Research Disclosure 17463".

*Primary Examiner*—Ellen McAvoy
*Attorney, Agent, or Firm*—Melanie L. Brown; Jay P. Friedenson

[57] ABSTRACT

The present invention provides a novel lubricating composition comprising polybutylene glycol having a cap of a fluorinated alkyl group on at least one end thereof. The composition has a molecular weight between about 300 and about 4,000, and a viscosity of about 5 to about 150 centistokes at 37° C. The composition is miscible in combination with refrigerant.

As such, the present invention provides a composition for use in compression refrigeration and air-conditioning comprising: (a) a refrigerant selected from the group consisting of hydrofluorocarbon, hydrochlorofluorocarbon, fluorocarbon, and chlorofluorocarbon; and (b) a sufficient amount to provide lubrication of at least one polybutylene glycol having a cap of a fluorinated alkyl group on at least one end thereof.

22 Claims, No Drawings

FLUORINATED BUTYLENE OXIDE BASED REFRIGERANT LUBRICANTS

This application is a continuation-in-part of Ser. No. 290,120 filed Dec. 27, 1988, allowed, now U.S. Pat. No. 4,975,212.

CROSS-REFERENCE TO RELATED APPLICATION

Commonly assigned allowed U.S. patent application Ser. No. 290,120 filed Dec. 27, 1988 claims a lubricating composition comprising a polyoxyalkylene glycol having a cap of a fluorinated alkyl group on at least one end thereof wherein the polyoxyalkylene glycol is prepared from copolymers of ethylene and propylene oxides, ethylene and butylene oxides, or propylene and butylene oxides.

BACKGROUND OF THE INVENTION

The present invention relates to novel lubricating compositions and their use with refrigerants. More particularly, the present invention relates to novel lubricating compositions for use with tetrafluoroethane and preferably, 1,1,1,2-tetrafluoroethane (known in the art as R134a). R134a is a refrigerant which may replace dichlorodifluoromethane (known in the art as R12) in many applications because environmental concerns over the use of R12 exist.

R134a has been mentioned as a possible replacement for R12 because concern over potential depletion of the ozone layer exists. R12 is used in closed loop refrigeration systems; many of these systems are automotive air-conditioning systems. R134a has properties similar to those of R12 so that it is possible to substitute R134a for R12 with minimal changes in equipment being required. The symmetrical isomer of R134a is R134 (1,1,2,2-tetrafluoroethane); the isomer is also similar in properties and may also be used. Consequently, it should be understood that in the following discussion, "tetrafluoroethane" will refer to both R134 and R134a.

A unique problem arises in such a substitution. Refrigeration systems which use R-12 generally use mineral oils to lubricate the compressor; the present discussion does not apply to absorption refrigeration equipment. See for example the discussion in Chapter 32 of the 1980 ASHRAE Systems Handbook. R-12 is completely miscible with such oils throughout the entire range of refrigeration system temperatures which may range from about −45.6° to 65.6° C. Consequently, oil which dissolves in the refrigerant travels around the refrigeration loop and generally returns with the refrigerant to the compressor. The oil does not separate during condensation, although it may accumulate because low temperatures exist when the refrigerant is evaporated. At the same time, the oil which lubricates the compressor contains some refrigerant which may affect its lubricating property.

It is known in the industry that chlorodifluoroethane (known in the art as R22) and monochlorodifluoromethane/1-chloro-1,1,2,2,2-pentafluoroe thane (known in the art as R502) are not completely miscible in common refrigeration oils. See Downing, FLUOROCARBONS REFRIGERANT HANDBOOK, p. 13. A solution to this problem has been the use of alkylated benzene oils. Such oils are immiscible in R134a and are not useful therewith. This problem is most severe at low temperatures when a separated oil layer would have a very high viscosity. problems of oil returning to the compressor would be severe.

R134a is not miscible with mineral oils; consequently, different lubricants will be required for use with R134a. However, as mentioned above, no changes to equipment should be necessary when the refrigerant substitution is made. If the lubricant separates from the refrigerant, it is expected that serious operating problems could result. For example, the compressor could be inadequately lubricated if refrigerant replaces the lubricant. Significant problems in other equipment also could result if a lubricant phase separates from the refrigerant during condensation, expansion, or evaporation. These problems are expected to be most serious in automotive air-conditioning systems because the compressors are not separately lubricated and a mixture of refrigerant and lubricant circulates throughout the entire system.

These problems have been recognized generally in the refrigeration art. Two recent publications by ASHRAE suggest that separation of lubricants and refrigerants presents problems, although no mention is made of R134a. These articles are Kruse et al., "Fundamentals of Lubrication in Refrigeration Systems and Heat Pumps," *ASHRAE TRANSACTIONS* 90(2B), 763 (1984) and Spauschus, "Evaluation of Lubricants for Refrigeration and Air-Conditioning Compressors," ibid, 784.

The following discussion will be more readily understood if the mutual solubility of refrigerants and various lubricating oils is considered in general with specific reference to R134a. Small amounts of lubricants may be soluble in R134a over a wide range of temperatures, but as the concentration of the lubricant increases, the temperature range over which complete miscibility occurs, i.e., only one liquid phase is present, narrows substantially. For any composition, two consolute temperatures, i.e., a lower and a higher temperature, may exist. That is, a relatively low temperature below which two distinct liquid phases are present and above which the two phases become miscible and a higher temperature at which the single phase disappears and two phases appear again may exist. A diagram of such a system for R502 refrigerant is shown as FIG. 2 in the Kruse et al. paper mentioned above. A range of temperatures where one phase is present exists and while it would be desirable that a refrigeration system operate within such a range, it has been found that for typical compositions, the miscible range of lubricants with R134a is not wide enough to encompass the typical refrigeration temperatures.

Some disclosures which are concerned with the choice of lubricants when R134a is used as a refrigerant exist. Polyalkylene glycols were suggested to be used in Research Disclosure 17483, October 1978 by DuPont. Specific reference was made to such oils produced by Union Carbide Corporation under the trade names "ULCON" (sic) LB-165 and UCON 525. It is stated that these oils are miscible in all proportions with R134a at temperatures at least as low as −50° C. It is believed that "ULCON" (sic) LB-165 and UCON 525 are polyoxypropylene glycols which have a hydroxy group at one end of each molecule and a n-butyl group at the other end.

The use of synthetic oils for refrigeration systems including polyoxyalkylene glycols is discussed by Sanvordenker et al. in a paper given at a ASHRAE Symposium, June 29, 1972. The authors make the point that polyglycols should properly be called ethers and esters rather than glycols because the terminal hydroxyl groups are bound by ester or ether groups. It is stated that this substitution makes them suitable for lubrication.

U.S. Pat. No. 4,428,854 discloses the use of R134a as an absorption refrigerant where organic solvents are used as absorbing agents. An example is tetraethylene glycol dimethyl ether. A related patent U.S. Pat. No. 4,454,052 also discloses polyethylene glycol methyl ether used as an absorbent along with certain stabilizing materials for refrigerants such as 134a.

Japanese Patent Publication 96684 dated May 30, 1985 addresses the stability problems of refrigerants. The reference teaches that perfluoro ether oligomers are one class of useful lubrication oils.

U.S. Pat. No. 4,267,064 also recommends the use of polyglycol oils, particularly for rotary compressors. It is indicated that viscosities in the range of 25-50 centistokes (CS) at 98.9° C. are needed plus a viscosity index greater than 150. Many refrigerants are mentioned but not tetrafluoroethane.

Japanese published application No. 51795 of 1982 relates to antioxidants and corrosion inhibitors for use with various polyether type synthetic oils. The tests were carried out with R-12, which does not exhibit the immiscible character of R134a.

Japanese published patent application 96,684 published May 30, 1985 addresses the stability problems of refrigerants. The reference mentions 12 refrigerants including tetrafluoroethane. The reference also teaches six classes of lubricants including perfluoro ether oligomer, fluorinated silicone, fluorinated oxethane, chlorotrifluoro ethylene polymer, fluorinated polyphenyl ether, and perfluoroamine.

U.S. Pat. No. 4,431,557 relates to additives used in synthetic oils. Many refrigerants are mentioned, but not tetrafluoroethane, and the patentees gave no indication of concern for miscibility of the refrigerants and the lubricants.

Commonly assigned U.S. Pat. No. 4,755,316 teaches a compression refrigeration composition. The refrigerant is tetrafluoroethane while the lubricant is at least one polyoxyalkylene glycol which is at least difunctional with respect to hydroxyl groups, has a molecular weight between 300 and 2,000, has a viscosity of about 25-150 centistokes at 37° C., has a viscosity index of at least 20, and is miscible in combination with the tetrafluoroethane in the range between −40° C. and at least +20° C. The reference does not teach or suggest the present fluorinated lubricating compositions. See also U.S. Pat. No. 4,948,525.

U.K. Patent 1,087,283; U.S. Pat. Nos. 3,483,129; 4,052,277; 4,118,398; 4,379,768; 4,443,349; 4,675,452; 4,827,042; 4,898,991; and 4,931,199; International Publications WO 87/02992 and WO 87/02993; and Kokai Patent Publication 118,598 published May 11, 1989 teach perfluorinated ethers and perfluoropolyethers as lubricants. The references do not teach the present fluorinated lubricating compositions and the references do not teach that their lubricants are useful with R134a. Also, Kokai Patent Publication 146,996, published June 30, 1987, teaches the addition of a perfluoroalkylpolyether as an extreme pressure additive to mineral oil.

Carre, "The Performance of Perfluoropolyalkyether Oils under Boundary Lubrication Conditions", *TRIBOLOGY TRANSACTIONS* 31(4), 437 (1987) and Carre, 1988 Air Force Report discuss the problems of perfluoropolyalkylethers and boundary lubrication in spacecraft.

U.K. Patent 1,354,138 teaches compounds of the formula:

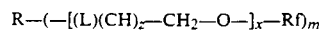

wherein L is —H or —CH$_3$ and z is 0, 1, or 2 on page 1, lines 9-41. As such, the oxyalkylene group can be oxymethylene when z is 0, ethylene oxide when z is 1 and L is —H, straight chain propylene oxide when z is 2 and L is —H, branched propylene oxide when z is 1 and L is —CH$_3$, and branched oxypentylene when z is 2 and L is —CH$_3$. These materials are taught to be useful as surfactants.

U.S. Pat. No. 4,079,084 teaches a compound having a chain of repeating units which may be oxyalkylidine, oxymethylene, oxyalkylene, imino alkylene, or secondary amido chains and at least two terminal perfluorocarbon groups of at least three carbon atoms. For the oxyalkylene unit, the reference teaches ethylene oxide, propylene oxide, or butylene oxide. These materials are taught to be useful as surfactants.

U.S. Pat. No. 2,723,999 teaches compounds of polyethylene glycols or polypropylene glycols. These materials are taught to be useful as surface active agents.

U.S. Pat. No. 4,359,394 teaches that a minor portion of an additive such as a fluorinated aromatic, for example, benzotrifluoride, can be added to a conventional lubricant such as mineral oil. The reference does not teach that a fluorinated aromatic alone is useful as a lubricant.

U.S. Pat. No. 4,944,890 teaches a refrigerant composition of R134a and a copolymer of a fluorinated olefin and nC$_4$H$_9$OHC=CH$_2$.

Because it is expected that R134a will become widely used in the field of refrigeration and air-conditioning, new improved lubricants useful with R134a are needed in the art.

In addition to the aforedescribed problem that mineral oil is immiscible with R134a, the industry faces another problem in the substitution of R134a for R12. Upon the conversion of a refrigeration system to R134a and the addition of a substitute lubricant which is miscible with R134a to the system, the industry is concerned that any currently used lubricant such as mineral oil remaining in the system would be immiscible with the substitute lubricant. If the mineral oil is immiscible with the new lubricant, the mineral oil can accumulate in parts of the refrigeration system and coat heat exchange surfaces. As such, these coated surfaces would be unable to exchange heat efficiently.

If a substitute lubricant was miscible with both R134a and currently used lubricants such as mineral oil, any mineral oil remaining in the system would circulate with the substitute lubricant and the preceding problem would be eliminated. As such, the need exists in the art for a lubricant which is miscible with both a fluorocarbon, hydrochlorofluorocarbon, or hydrofluorocarbon refrigerant such as R134a and currently used lubricants such as mineral oil.

SUMMARY OF THE INVENTION

We have unexpectedly found lubricants that are miscible with both currently used lubricants such as mineral oil, alkyl benzenes, and esters and also with replacement refrigerants such as R134a. The present lubricating compositions comprise a polybutylene glycol having a cap of a fluorinated alkyl group on at least one end thereof The composition has a molecular weight between about 300 and about 4,000 and a viscosity of about 5 to about 150 centistokes at 37° C. As such, the present invention provides a composition for use in compression refrigeration and air-conditioning comprising: (a) a refrigerant selected from the group consisting of hydrofluorocarbon, hydrochlorofluorocarbon, fluorocarbon, and chlorofluorocarbon; and (b) a sufficient amount to provide lubrication of at least one polybutylene glycol having a cap of a fluorinated alkyl group on at least one end thereof.

Preferably, the novel lubricating composition comprises the formula (I)

$$R_1OR_2[C_4H_8O]_m[C_3H_6O]_nR_3$$

wherein m is 4 to 36, n is 0 to 36, $R_2$ is $-C_pH_{2p}O-$ wherein p is 0 to 4, and $R_1$ and $R_3$ are independently selected from the group consisting of hydrogen, alkyl group, and fluorinated alkyl group wherein the ratio of m to n is at least 2. At least one of $R_1$ and $R_3$ is a fluorinated alkyl group. Examples of alkyl groups include methyl, ethyl, n-propyl, isopropyl, n-butyl, sec-butyl, tert-butyl, n-pentyl, isopentyl, neopentyl, and the like. As such, the present lubricating composition may be terminated by a hydrogen at one end and a fluorinated alkyl group at the other end, by an alkyl group at one end and a fluorinated alkyl group at the other end, or by a fluorinated alkyl group at both ends. The fluorinated alkyl group may be branched or straight chain as long as fluorine atoms are attached thereto.

Preferably, n is 0 and m is about 5 to about 25 so that the preferred molecular weight of the lubricant is about 433 to about 1,930.

The present lubricating compositions may be formed by fluorinating polybutylene glycols. The polybutylene glycols used may have primary carbons at both ends, a primary carbon at one end and a secondary carbon at the other end, or secondary carbons at both ends.

In a more preferred embodiment, at least one of $R_1$ and $R_3$ is a flubrinated alkyl group of the formula (II)

$$-(CH_2)_x(CF_2)_yCF_3$$

wherein x is 1 to 4 and y is 0 to 15. More preferably, x is 1 and y is 0 so that at least one of $R_1$ and $R_3$ is a fluorinated alkyl group of the formula $-CH_2CF_3$ or x is 1 and y is 2 so that at least one of $R_1$ and $R_3$ is a fluorinated alkyl group of the formula $-CH_2(CF_2)_2CF_3$. Even more preferably, both $R_1$ and $R_3$ are fluorinated alkyl groups and m is 5 to 25.

The most preferred lubricating compositions are $$CF_3CH_2O[C_4H_8O]_mCH_2CF_3$$

$$CF_3(CF_2)_2CH_2O[C_4H_8O]_mCH_2(CF_2)_2CF_3$$

where m is 5 to 25.

Generally, the novel lubricating compositions may be formed by capping a polybutylene glycol with at least one fluorinated alkyl group. For the copolymers, propylene and butylene oxides may be copolymerized and the resulting copolymer may then be terminated with at least one fluorinated alkyl group. Preferably, the novel lubricating compositions wherein one end has an alkyl group and the other end has a fluorinated alkyl group or both ends have fluorinated alkyl groups are formed as follows. The polybutylene glycol is converted to the tosylate by treatment with p-toluenesulfonyl chloride in a suitable base such as pyridine and then the tosylated polyglycol is reacted with the sodium alkoxide of the appropriate fluorinated alcohol.

Preferably, the novel lubricating compositions wherein one end has a hydroxyl group and the other end has a fluorinated alkyl group are formed as follows An alcohol initiator such as the sodium alkoxide of trifluoroethanol is used in the polymerization of polybutylene oxide.

Regarding the known lubricants with which the present lubricants are miscible, mineral oil is paraffin oil or naphthenic and is commercially available. Commercially available alkyl benzene lubricants include Zerol 150 (registered trademark). Commercially available esters include neopentyl glycol dipelargonate which is available as Emery 2917 (registered trademark) and Hatcol 2370 (registered trademark).

The present invention also provides a method for improving lubrication in refrigeration and air-conditioning equipment using a hydrofluorocarbon, hydrochlorofluorocarbon, or fluorocarbon refrigerant. The method comprises the step of: employing a sufficient amount to provide lubrication of at least one polybutylene glycol having a cap of a fluorinated alkyl group on at least one end thereof. The lubricant has a molecular weight of about 300 to about 3,000 and has a viscosity of about 5 to about 150 centistokes at 37° C.

The present invention also provides a lubricating composition comprising a polyoxyalkylene glycol having a cap of a fluorinated alkyl group on at least one end thereof wherein the polyoxyalkylene glycol is formed from copolymer of propylene oxide and butylene oxide and the composition has a molecular weight between about 300 and about 4,000, and a viscosity of about 5 to about 150 centistokes at 37° C. The lubricating composition is miscible with a refrigerant selected from the group consisting of hydrofluorocarbon, hydrochlorofluorocarbon, fluorocarbon, and chlorofluorocarbon.

The present invention also provides a composition for use in compression refrigeration and air-conditioning comprising: (a) at least one refrigerant selected from the group consisting of hydrofluorocarbon, hydrochlorofluorocarbon, fluorocarbon, and chlorofluorocarbon; (b) a sufficient amount to provide lubrication of at least one polybutylene glycol wherein the lubricant has a molecular weight of about 300 to about 4,000 and has a viscosity of about 5 to about 150 centistokes at 37° C.; and (c) a non-fluorinated lubricant selected from the group consisting of mineral oil and alkyl benzene. The polybutylene glycol may have a cap of a fluorinated group on at least one end thereof.

Other advantages of the present invention will become apparent from the following description and appended claims.

DETAILED DESCRIPTION QF THE PREFERRED EMBODIMENTS

Refrigerants

The present novel lubricating compositions may be used in most lubricating applications but they are particularly useful with R134a.

The invention relates to the substitution of tetrafluoroethane, and preferably, 1,1,1,2-tetrafluoroethane for R-12 which has been considered to present a danger to the atmospheric ozone layer R134a has physical characteristics which allow its substitution for R-12 with only a minimum of equipment changes although it is more expensive and unavailable in large quantities at the present time. Its symmetrical isomer, R134, may also be used. The detrimental effect of tetrafluoroethane on atmospheric ozone is considered to be much less than the effect of R-12, and therefore, the substitution of tetrafluoroethane for R-12 is considered probable in the future.

Until R134a becomes available in commercial quantities, it may be produced by any known method including reacting ethylene with carbon having elemental fluorine adsorbed therein as taught by commonly assigned U.S. Pat. No. 4,937,398 which is incorporated herein by reference.

The present lubricants are also suitable for use with R12, R22, R502, methylene fluoride (known in the art as R32), 1-chloro-1,1,2,2-tetrafluoroethane (known in the art as R124a), pentafluoroethane (known in the art as R125), 1-chloro-1,1-difluoroethane (known in the art as R142b), 1,1,1-trifluoroethane (known in the art as 143a), 1,1-difluoroethane (known in the art as R152a), and cycloperfluorobutane (known in the art as RC318). These refrigerants may be used alone or in mixtures thereof in any proportions However, it should be understood that only blends of refrigerants which are miscible with the lubricants of the invention are included.

R-12 is used in very large quantities and of the total, a substantial fraction is used for automotive air-conditioning. Consequently, the investigation of the lubricants needed for use with R134a (or R134) has emphasized the requirements of automotive air-conditioning since the temperature range is generally higher than that of other refrigeration systems, i.e., about 0° C. to 93° C. Since it has been found that R134a differs in being much less miscible with common lubricants than R-12, the substitution of refrigerants becomes more difficult.

Lubricants

R-12 is fully miscible in ordinary mineral oils and consequently, separation of the lubricants is not a problem. Although it is similar to R12, R134a is relatively immiscible in many lubricants as may be seen by reference to commonly assigned U.S. Pat. No. 4,755,316. Thus, it is necessary to find suitable lubricants which are miscible with R134a (or R134) to avoid refrigerant and lubricant separation.

It is characteristic of some refrigerant-lubricant mixtures that a temperature exists above which the lubricant separates. Since this phenomenon occurs also at some low temperatures, a limited range of temperatures within which the two fluids are miscible may occur. Ideally, this range should span the operating temperature range in which the refrigerant is to operate, but often this is not possible. It is typical of automotive air-conditioning systems that a significant fraction of the circulating charge is lubricant and the refrigerant and lubricant circulate together through the system. Separation of the lubricant and refrigerant as they return to the compressor could result in erratic lubrication of the moving parts and premature failure. Other air-conditioning system types usually circulate only the relatively smaller amount of lubricant which is carried by the refrigerant gas passing through the compressor and should be less sensitive to the separation problem. Especially with automotive air-conditioning, separation of the relatively large amount of lubricant circulating with the refrigerant can also affect the performance of other parts of the system.

In a typical automotive air-conditioning system, the temperatures at which the refrigerant is condensed originally will be about 50°–70° C. but may reach 90° C. in high ambient temperature operation. The condensation of hot refrigerant gases in the condensing heat exchanger can be affected if the exchanger is coated with lubricant preferentially so that condensation of the refrigerant occurs by contact with the lubricant film. Thereafter, the two-phase mixture of lubricant and refrigerant must pass through a pressure reduction to the low temperature stage where the refrigerant evaporates and absorbs the heat given up in cooling air and condensing moisture If lubricant separates at the condenser, then the performance of the evaporator stage can be affected if separate phases persist as the two-phase mixture passes through the pressure reduction step. As with the condenser, accumulation of lubricant on the evaporator coils can affect heat exchange efficiency. In addition, the low evaporator temperatures may result in excessive cooling of the lubricant resulting in a more viscous liquid and trapping of the lubricant in the evaporator. These problems can be avoided if the lubricant and the refrigerant are fully miscible throughout the operating temperature ranges, as was true with R-12 and mineral oil mixtures. R134a, with its limited ability to dissolve lubricants, presents a problem which must be solved.

A blend of the present lubricating compositions wherein the compositions have different molecular weights may be used in practicing the present invention The present polybutylene glycols may also be blended with lubricants of polypropylene glycols which might or might not have a cap of a fluorinated alkyl group on at least one end thereof.

The present lubricating compositions are miscible in combination with the refrigerant at some weight percent from about 1 to about 99 and preferably from about 1 to about 15.

The miscibility is not the only factor to be considered when one is selecting a lubricant for automotive air-conditioning service (or other refrigeration applications). Lubricating properties also must be satisfactory for the intended application. Practically, this means that for automotive air conditioning, the viscosity of the lubricant will be about 5–150 centistokes, preferably about 100 centistokes (CS) at 37° C. with a viscosity index of at least 20 in order that the lubricant is sufficiently viscous at high temperatures to lubricate while remaining sufficiently fluid to circulate around the refrigeration circuit at low temperatures The range of viscosity may also be expressed as about 3–24 CS at 98.9° C. In addition, the lubricant should be chemically stable and not cause corrosion or other problems in long-term service. Other factors which should be considered in selecting lubricants are compatibility, lubricity, safety, and the like.

Additives which may be used to enhance performance include (1) extreme pressure and antiwear additives, (2) oxidation and thermal stability improvers, (3) corrosion inhibitors, (4) viscosity index improvers, (5) pour and floc point depressants, (6) detergent, (7) anti foaming agents, and (8) viscosity adjusters. Typical members of these classes are listed in TABLE 1 below.

TABLE 1

| Class Additive | Typical Members of the Class |
| --- | --- |
| 1. Extreme pressure and anti-wear | phosphates, phosphate esters (bicresyl phosphate), phosphites, thiophosphates (zinc diorganodithiophosphates) chlorinated waxes, sulfurized fats and olefins, organic lead compounds, fatty acids, molybdenum complexes, halogen substituted organosilicon compounds, borates, organic esters, halogen substituted phosphorous compounds, sulfurized Diels Alder adducts, organic sulfides, compounds containing chlorine and sulfur, metal salts of organic acids. |
| 2. Oxidation and thermal stability improvers | sterically hindered phenols (BHT), aromatic amines, dithiophosphates, phosphites, sulfides, metal salts of dithio acids. |
| 3. Corrosion Inhibitors | organic acids, organic amines, organic phosphates, organic alcohols, metal sulfonates, organic phosphites. |
| 4. Viscosity index improvers | polyisobutylene, polymethacrylate, polyalkylstyrenes. |
| 5. Pour Point &/or floc point depressants | polymethacrylate ethylene-vinyl acetate copolymers, succinamic acid-olefin copolymers, ethylene-alpha olefin copolymers, Friedel-Crafts condensation products of wax with naphthalene or phenols. |
| 6. Detergents | sulfonates, long-chain alkyl substituted aromatic sulfonic acids, phosphonates, thiophosphonates, phenolates, metal salts of alkyl phenols, alkyl sulfides, alkylphenol-aldehyde condensation products, metal salts of substituted salicylates, N-substituted oligomers or polymers from the reaction products of unsaturated anhydrides and amines, copolymers of methacrylates with N-substituted compounds such as N-vinyl pyrrolidone or dimethylaminoethyl methacrylate, copolymers which incorporate polyester linkages such as vinyl acetate-maleic anhydride copolymers. |
| 7. Anti-Foaming Agents | silicone polymers |
| 8. Viscosity Adjusters | Polyisobutylene, polymethacrylates, polyalkylstyrenes, naphthenic oils, alkylbenzene oils, paraffinic oils, polyesters, polyvinylchloride, polyphosphates. |

The present invention is more fully illustrated by the following non-limiting examples.

Comparatives

These comparatives demonstrate that currently used lubricants are immiscible with R134a. In the following Table 2, Winsor Lube L245X (registered trademark) is a mineral sold by Anderson Oil and Chemical. Zerol 150 (registered trademark) ia an alkyl benzene oil sold by Shrieve Chemical Krytox 143AB (registered trademark) is a homopolymer of hexafluoropropylene epoxide, has a molecular weight of 3700, and is commercially available from du Pont. The results indicate that mineral oils, alkyl benzenes, and perfluoropolyethers are immiscible with R134 even at low concentrations of oil in refrigerant In any refrigeration and air-conditioning system, this creates a serious problem for oil return to the compressor.

| Lubricant | Visc (37° C.) | Lub Wt. % | Misc (°C.) |
| --- | --- | --- | --- |
| Zerol 150 (registered trademark) | 32 | 2 | immiscible at room temperature |
| Zerol 150 (registered trademark) | 32 | 0.5 | immiscible at room temperature |
| Winsor L245X (registered trademark) | 32 | 2.25 | immiscible at room temperature |
| Winsor L245X (registered trademark) | 32 | 0.54 | immiscible at room temperature |
| Krytox 143AB (registered trademark) | — | — | immiscible |

EXAMPLES 1-6

Examples 1-6 are directed to the preparation of lubricants useful in the present invention.

EXAMPLE 1

This example was directed to the preparation of bis-trifluoroethyl(polybutylene glycol) which has the formula $CF_3CH_2O[C_4H_8O]_mCH_2CF_3$ where m is 9. The molecular weight of this lubricant is 849.

Polybutylene glycol of molecular weight 685 (1 kilogram, 1.46 moles) was dissolved in pyridine (2 kilograms, 2.5 moles) and cooled to 0° C.; p-Toluenesulfonyl chloride (0.62 kilogram, 3.25 moles) was added at a rate to keep the internal temperature at or below 15° C. After the addition was complete, the reaction was maintained at this temperature for 4 hours to complete the formation of the dimesylate of polybutylene glycol. The reaction mixture was then quenched in water (6 kilograms, 333 moles.)

The product was extracted from the pyridine water solution by extracting the mixture with 6 liters of butylether. The ether solution was washed with 10N hydrochloric acid (4 liters) and finally 14N ammonium hydroxide (3 liters). The ether layer was dried over sodium sulfate (0.25 kilogram) and then filtered. The resulting butylether-product solution contained 1.34 kilograms of ditosylate representing a yield of 92%.

The final product was prepared by reacting the dimesylate with sodium trifluoroethylate (0.39 kilogram, 3.2 moles) in the butylether solution at 90° C. for 8 hours. The precipitated sodium tosylate was removed by filtration. The resulting ether solution was washed successively with 3% sodium hydroxide (2L), 6N hydrochloric acid (2 liters) and saturated sodium carbonate solution (1 liter). After drying over sodium sulfate (0.25 kilogram), the final product was isolated by removing the butylether by distillation. The final product was isolated as a colorless oil (1.16 kilograms, 90%).

EXAMPLE 2

This example was directed to the preparation of the bis-trifluoroethyl(polybutylene glycol) of Example 1 wherein m is 14. The material was prepared according to Example 1 except that the molecular weight of the starting polybutylene glycol was 1059. The molecular weight of the lubricant is 1225.

EXAMPLE 3

This example was directed to the preparation of the bis-trifluoroethyl(polybutylene glycol) of Example 1 wherein m is 19. The material was prepared according to Example 1 except that the molecular weight of the starting polybutylene glycol was 1385. The molecular weight of the lubricant is 1549.

EXAMPLE 4

This example is directed to the preparation of the lubricant of the formula $$CF_3(CF_2)_2CH_2O[C_4H_8O]_mCH_2(CF_2)_2CF_3$$

wherein m is 9. The material is prepared according to Example 1 except that the sodium salt of 1H,1H-perfluorobutanol is used as the capping alkoxide rather than the sodium salt of trifluoroethanol. The molecular weight of the lubricant is 909.

EXAMPLE 5

This example is directed to the preparation of the novel lubricating composition of Example 4, except that m is 14. The molecular weight of the lubricant is 1283.

EXAMPLE 6

This example is directed to the preparation of the novel lubricating composition of Example 4, except that m is 19. The molecular weight of the lubricant is 1609.

EXAMPLE 7

The miscibility of the lubricating composition of Example 1 was determined by combining it with refrigerant in a glass tube and observing the results when the tubes were maintained at preselected temperatures. A tube was filled with the desired amount of lubricant and then refrigerant was added while the oil was frozen in liquid nitrogen The tube was then sealed and immersed in a thermostated bath. After the temperature was equilibrated, the miscibility of the lubricant and refrigerant was determined by visual observation. The results of the tests made with R-134a are shown below.

| LUBRICANT | VISC. (cs) | MW | EX WT % GLY | MISC (°C.) |
|---|---|---|---|---|
| Example 1 | 29 | 851 | 15.4 | −42 to >75 |
| Example 1 | 29 | 851 | 5 | −54 to >75 |
| Example 2 | 60 | 1225 | 5 | −4 to 57 |

Both lubricant/refrigerant mixtures remained clear at the temperatures indicated.

EXAMPLES 8-59

The following lubricants are combined with each of R134a, R12, R22, and R502 and the mixcibility is determined as described in Example 7 above. MW stands for molecular weight. Each lubricant exhibits satisfactory miscibility with each refrigerant.

| EX | LUBRICANT | MW |
|---|---|---|
| 8 | HO—[C$_4$H$_8$O]$_4$—CH$_2$CF$_3$ | 388 |
| 9 | HO—[C$_4$H$_8$O]$_8$—CH$_2$CF$_3$ | 676 |
| 10 | HO—[C$_4$H$_8$O]$_{12}$—CH$_2$CF$_3$ | 964 |
| 11 | HO—[C$_4$H$_8$O]$_{16}$—CH$_2$CF$_3$ | 1,252 |
| 12 | HO—[C$_4$H$_8$O]$_5$—CH$_2$C$_3$F$_7$ | 560 |
| 13 | HO—[C$_4$H$_8$O]$_9$—CH$_2$C$_3$F$_7$ | 848 |
| 14 | HO—[C$_4$H$_8$O]$_{13}$—CH$_2$C$_3$F$_7$ | 1,136 |
| 15 | HO—[C$_4$H$_8$O]$_{17}$—CH$_2$C$_3$F$_7$ | 1,424 |
| 16 | CH$_3$O—[C$_4$H$_8$O]$_{22}$—CH$_2$CF$_3$ | 1,698 |
| 17 | CH$_3$O—[C$_4$H$_8$O]$_{26}$—CH$_2$CF$_3$ | 1,986 |
| 18 | CH$_3$O—[C$_4$H$_8$O]$_{30}$—CH$_2$CF$_3$ | 2,274 |
| 19 | CH$_3$O—[C$_4$H$_8$O]$_{34}$—CH$_2$CF$_3$ | 2,562 |
| 20 | CH$_3$O—[C$_4$H$_8$O]$_{21}$—CH$_2$C$_3$F$_7$ | 1,726 |
| 21 | CH$_3$O—[C$_4$H$_8$O]$_{25}$—CH$_2$C$_3$F$_7$ | 2,014 |

-continued

| EX | LUBRICANT | MW |
|---|---|---|
| 22 | CH$_3$O—[C$_4$H$_8$O]$_{29}$—CH$_2$C$_3$F$_7$ | 2,302 |
| 23 | CH$_3$O—[C$_4$H$_8$O]$_{33}$—CH$_2$C$_3$F$_7$ | 2,590 |
| 24 | C$_2$H$_5$O—[C$_4$H$_8$O]$_{23}$—CH$_2$CF$_3$ | 1,784 |
| 25 | C$_2$H$_5$O—[C$_4$H$_8$O]$_{27}$—CH$_2$CF$_3$ | 2,072 |
| 26 | C$_2$H$_5$O—[C$_4$H$_8$O]$_{31}$—CH$_2$CF$_3$ | 2,360 |
| 27 | C$_2$H$_5$O—[C$_4$H$_8$O]$_{35}$—CH$_2$CF$_3$ | 2,648 |
| 28 | C$_2$H$_5$O—[C$_4$H$_8$O]$_{24}$—CH$_2$C$_3$F$_7$ | 1,956 |
| 29 | C$_2$H$_5$O—[C$_4$H$_8$O]$_{28}$—CH$_2$C$_3$F$_7$ | 2,244 |
| 30 | C$_2$H$_5$O—[C$_4$H$_8$O]$_{32}$—CH$_2$C$_3$F$_7$ | 2,532 |
| 31 | C$_2$H$_5$O—[C$_4$H$_8$O]$_{36}$—CH$_2$C$_3$F$_7$ | 2,820 |
| 32 | C$_3$H$_7$O—[C$_4$H$_8$O]$_{25}$—CH$_2$CF$_3$ | 1,942 |
| 33 | C$_3$H$_7$O—[C$_4$H$_8$O]$_{29}$—CH$_2$CF$_3$ | 2,230 |
| 34 | C$_3$H$_7$O—[C$_4$H$_8$O]$_{33}$—CH$_2$CF$_3$ | 2,518 |
| 35 | C$_3$H$_7$O—[C$_4$H$_8$O]$_{36}$—CH$_2$CF$_3$ | 2,734 |
| 36 | C$_3$H$_7$O—[C$_4$H$_8$O]$_{26}$—CH$_2$C$_3$F$_7$ | 2,114 |
| 37 | C$_3$H$_7$O—[C$_4$H$_8$O]$_{30}$—CH$_2$C$_3$F$_7$ | 2,402 |
| 38 | C$_3$H$_7$O—[C$_4$H$_8$O]$_{34}$—CH$_2$C$_3$F$_7$ | 2,690 |
| 39 | C$_3$H$_7$O—[C$_4$H$_8$O]$_{36}$—CH$_2$C$_3$F$_7$ | 2,834 |
| 40 | C$_4$H$_9$O—[C$_4$H$_8$O]$_{27}$—CH$_2$CF$_3$ | 2,100 |
| 41 | C$_4$H$_9$O—[C$_4$H$_8$O]$_{31}$—CH$_2$CF$_3$ | 2,388 |
| 42 | C$_4$H$_9$O—[C$_4$H$_8$O]$_{35}$—CH$_2$CF$_3$ | 2,676 |
| 43 | C$_4$H$_9$O—[C$_4$H$_8$O]$_{36}$—CH$_2$CF$_3$ | 2,748 |
| 44 | C$_4$H$_9$O—[C$_4$H$_8$O]$_{28}$—CH$_2$C$_3$F$_7$ | 2,272 |
| 45 | C$_4$H$_9$O—[C$_4$H$_8$O]$_{32}$—CH$_2$C$_3$F$_7$ | 2,560 |
| 46 | C$_4$H$_9$O—[C$_4$H$_8$O]$_{36}$—CH$_2$C$_3$F$_7$ | 2,848 |
| 47 | C$_4$H$_9$O—[C$_4$H$_8$O]$_{24}$—CH$_2$C$_3$F$_7$ | 1,984 |
| 48 | F$_3$CH$_2$CO—[C$_4$H$_8$O]$_7$—CH$_2$CF$_3$ | 686 |
| 49 | F$_3$CH$_2$CO—[C$_4$H$_8$O]$_{11}$—CH$_2$CF$_3$ | 974 |
| 50 | F$_3$CH$_2$CO—[C$_4$H$_8$O]$_{15}$—CH$_2$CF$_3$ | 1,262 |
| 51 | F$_3$CH$_2$CO—[C$_4$H$_8$O]$_{19}$—CH$_2$CF$_3$ | 1,550 |
| 52 | F$_7$C$_3$H$_2$CO—[C$_4$H$_8$O]$_{23}$—CH$_2$C$_3$F$_7$ | 2,038 |
| 53 | F$_7$C$_3$H$_2$CO—[C$_4$H$_8$O]$_{27}$—CH$_2$C$_3$F$_7$ | 2,326 |
| 54 | F$_7$C$_3$H$_2$CO—[C$_4$H$_8$O]$_{31}$—CH$_2$C$_3$F$_7$ | 2,614 |
| 55 | F$_7$C$_3$H$_2$CO—[C$_4$H$_8$O]$_{36}$—CH$_2$C$_3$F$_7$ | 2,974 |
| 56 | F$_3$CH$_2$CO—[C$_4$H$_8$O]$_8$—CH$_2$C$_3$F$_7$ | 858 |
| 57 | F$_3$CH$_2$CO—[C$_4$H$_8$O]$_{12}$—CH$_2$C$_3$F$_7$ | 1,146 |
| 58 | F$_3$CH$_2$CO—[C$_4$H$_8$O]$_{16}$—CH$_2$C$_3$F$_7$ | 1,434 |
| 59 | F$_3$CH$_2$CO—[C$_4$H$_8$O]$_{20}$—CH$_2$C$_3$F$_7$ | 1,722 |

EXAMPLE 60

This example demonstrates that the present fluorinated polybutylene glycol lubricants are miscible with currently used lubricants such as mineral oils, alkyl benzenes, and esters. Sunoco 3GS (registered trademark) is a mineral oil which is commercially available from Witco. Zerol 150 (registered trademark) is an alkyl benzene oil which is commercially available from Shrieve Chemical. Emery 2930-A (registered trademark) is an ester lubricant which is commercially available from Emery. These lubricants were mixed in various proportions with the fluorinated polybutylene glycol of Example 1. The mixtures remained clear and were one phase.

| PRESENT LUBRICANT | KNOWN LUBRICANT | RESULT |
|---|---|---|
| Example 1 | Sunoco 3GS (registered trademark) | Clear, one phase mixture. |
| Example 1 | Zerol 150 (registered trademark) | Clear, one phase mixture. |
| Example 1 | Emery 2930-A (registered trademark) | Clear, one phase mixture. |

EXAMPLES 61-112

Each lubricant of Examples 1-6 and 8-59 is combined with each of the following known lubricants: mineral oil and alkyl benzene. Each mixture remains clear and is one phase.

EXAMPLE 113

One test commonly used in determining the performance of the lubricant is a Falex wear test. The test used here is described in the ASHRAE Journal, June 1969, pages 85-89 by D. F. Huttenlocher. The test was modified The wear in was done at 100 pounds for five minutes The test was then run at a constant load of 400 pounds for one hour. The speed of rotation of the pin was constant at 450 rpm. Before the test, HFC-134a was bubbled through the lubricant in order to saturate it. During the test, the refrigerant was bubbled through the refrigerant at a rate of 10 cc per minute in order to maintain saturation. The wear is measured by noting the decrease in mass of the pin or in teeth.

| LUBRICANT | WEAR |
|---|---|
| Comparative 4 | 16 teeth |
| Example 1 | 0 teeth |

EXAMPLES 114-165

The following lubricants are combined with each of R134a, R12, R22, R125, R143a, R32, R123, R123a, and R502 and the miscibility is determined as described in Example 7 above. MW stands for molecular weight. Each lubricant exhibits satisfactory miscibility with each refrigerant.

| EX | LUBRICANT | MW |
|---|---|---|
| 114 | $HO[C_4H_8O]_4[C_3H_6O]CH_2CF_3$ | 446 |
| 115 | $HO[C_4H_8O]_8[C_3H_6O]CH_2CF_3$ | 734 |
| 116 | $HO[C_4H_8O]_{12}[C_3H_6O]CH_2CF_3$ | 1,022 |
| 117 | $HO[C_4H_8O]_{16}[C_3H_6O]CH_2CF_3$ | 1,310 |
| 118 | $HO[C_4H_8O]_5[C_3H_6O]CH_2C_3F_7$ | 618 |
| 119 | $HO[C_4H_8O]_9[C_3H_6O]CH_2C_3F_7$ | 906 |
| 120 | $HO[C_4H_8O]_{13}[C_3H_6O]CH_2C_3F_7$ | 1,194 |
| 121 | $HO[C_4H_8O]_{17}[C_3H_6O]CH_2C_3F_7$ | 1,482 |
| 122 | $HO[C_4H_8O]_{20}[C_3H_6O]CH_2CF_3$ | 1,598 |
| 123 | $HO[C_4H_8O]_{24}[C_3H_6O]CH_2CF_3$ | 1,886 |
| 124 | $HO[C_4H_8O]_{28}[C_3H_6O]CH_2CF_3$ | 2,174 |
| 125 | $HO[C_4H_8O]_{32}[C_3H_6O]CH_2CF_3$ | 2,462 |
| 126 | $HO[C_4H_8O]_4[C_3H_6O]CH_2C_3F_7$ | 546 |
| 127 | $HO[C_4H_8O]_8[C_3H_6O]CH_2C_3F_7$ | 834 |
| 128 | $HO[C_4H_8O]_{12}[C_3H_6O]CH_2C_3F_7$ | 1,122 |
| 129 | $HO[C_4H_8O]_{16}[C_3H_6O]CH_2C_3F_7$ | 1,410 |
| 130 | $CH_3O[C_4H_8O]_5[C_3H_6O]CH_2CF_3$ | 532 |
| 131 | $CH_3O[C_4H_8O]_9[C_3H_6O]CH_2CF_3$ | 820 |
| 132 | $CH_3O[C_4H_8O]_{13}[C_3H_6O]CH_2CF_3$ | 1,108 |
| 133 | $CH_3O[C_4H_8O]_{17}[C_3H_6O]CH_2CF_3$ | 1,396 |
| 134 | $CH_3O[C_4H_8O]_6[C_3H_6O]CH_2C_3F_7$ | 704 |
| 135 | $CH_3O[C_4H_8O]_{10}[C_3H_6O]CH_2C_3F_7$ | 992 |
| 136 | $CH_3O[C_4H_8O]_{14}[C_3H_6O]CH_2C_3F_7$ | 1,280 |
| 137 | $CH_3O[C_4H_8O]_{18}[C_3H_6O]CH_2C_3F_7$ | 1,568 |
| 138 | $C_2H_5O[C_4H_8O]_7[C_3H_6O]CH_2CF_3$ | 690 |
| 139 | $C_2H_5O[C_4H_8O]_{11}[C_3H_6O]CH_2CF_3$ | 978 |
| 140 | $C_2H_5O[C_4H_8O]_{15}[C_3H_6O]CH_2CF_3$ | 1,266 |
| 141 | $C_2H_5O[C_4H_8O]_{19}[C_3H_6O]CH_2CF_3$ | 1,554 |
| 142 | $C_2H_5O[C_4H_8O]_8[C_3H_6O]CH_2C_3F_7$ | 862 |
| 143 | $C_2H_5O[C_4H_8O]_{12}[C_3H_6O]CH_2C_3F_7$ | 1,150 |
| 144 | $C_2H_5O[C_4H_8O]_{16}[C_3H_6O]CH_2C_3F_7$ | 1,438 |
| 145 | $C_2H_5O[C_4H_8O]_{20}[C_3H_6O]CH_2C_3F_7$ | 1,726 |
| 146 | $C_3H_7O[C_4H_8O]_9[C_3H_6O]CH_2CF_3$ | 848 |
| 147 | $C_3H_7O[C_4H_8O]_{13}[C_3H_6O]CH_2CF_3$ | 1,136 |
| 148 | $C_3H_7O[C_4H_8O]_{17}[C_3H_6O]CH_2CF_3$ | 1,424 |
| 149 | $C_3H_7O[C_4H_8O]_{21}[C_3H_6O]CH_2CF_3$ | 1,712 |
| 150 | $C_3H_7O[C_4H_8O]_{10}[C_3H_6O]CH_2C_3F_7$ | 1,020 |
| 151 | $C_3H_7O[C_4H_8O]_{14}[C_3H_6O]CH_2C_3F_7$ | 1,308 |
| 152 | $C_3H_7O[C_4H_8O]_{18}[C_3H_6O]CH_2C_3F_7$ | 1,596 |
| 153 | $C_3H_7O[C_4H_8O]_{22}[C_3H_6O]CH_2C_3F_7$ | 1,884 |
| 154 | $C_4H_9O[C_4H_8O]_{11}[C_3H_6O]CH_2CF_3$ | 1,006 |
| 155 | $C_4H_9O[C_4H_8O]_{15}[C_3H_6O]CH_2CF_3$ | 1,294 |
| 156 | $C_4H_9O[C_4H_8O]_{19}[C_3H_6O]CH_2CF_3$ | 1,582 |
| 157 | $C_4H_9O[C_4H_8O]_{23}[C_3H_6O]CH_2CF_3$ | 1,870 |
| 158 | $C_4H_9O[C_4H_8O]_{12}[C_3H_6O]CH_2C_3F_7$ | 1,058 |
| 159 | $C_4H_9O[C_4H_8O]_{16}[C_3H_6O]CH_2C_3F_7$ | 1,466 |
| 160 | $C_4H_9O[C_4H_8O]_{20}[C_3H_6O]CH_2C_3F_7$ | 1,754 |
| 161 | $C_4H_9O[C_4H_8O]_{24}[C_3H_6O]CH_2C_3F_7$ | 2,042 |
| 162 | $F_3CH_2CO[C_4H_8O]_{13}[C_3H_6O]CH_2CF_3$ | 1,176 |
| 163 | $F_3CH_2CO[C_4H_8O]_{17}[C_3H_6O]CH_2CF_3$ | 1,464 |
| 164 | $F_3CH_2CO[C_4H_8O]_{21}[C_3H_6O]CH_2CF_3$ | 1,752 |
| 165 | $F_3CH_2CO[C_4H_8O]_{25}[C_3H_6O]CH_2CF_3$ | 2,040 |

EXAMPLE 166

PBO 503 is a polybutylene glycol having a molecular weight of 503 and a viscosity of 45 centistokes at 37° C. The procedure of Example 7 was repeated with 15 percent by weight polybutylene glycol and the miscibility was $-1°$ to $> +65°$ C.

The polybutylene glycol is combined with each of the following known lubricants: mineral oil and alkyl benzene. Each mixture remains clear and is one phase.

EXAMPLE 167

A refrigeration system being converted to R134a contains residual mineral oil. R134a and the polybutylene glycol of Example 166 are added to the refrigeration system. The mineral oil dissolved in the polybutylene glycol and the polybutylene glycol dissolved in the R134a travel around the refrigeration loop and return with the R134a to the compressor.

EXAMPLE 168-225

A refrigeration system being converted to R134a contains residual mineral oil. R134a and each lubricant of Examples 1-6 and 8-59 are added to the refrigeration system. The mineral oil dissolved in each lubricant and the lubricant dissolved in the R134a travel around the refrigeration loop and return with the R134a to the compressor.

Having described the invention in detail and by reference to preferred embodiments thereof, it will be apparent that modifications and variations are possible without departing from the scope of the invention defined in the appended claims.

What is claimed is:

1. A composition for use in compression refrigeration and air-conditioning comprising
   (a) at least one refrigerant selected from the group consisting of hydrofluorocarbon, hydrochlorofluorocarbon, fluorocarbon, and chlorofluorocarbon; and
   (b) a sufficient amount to provide lubrication of at least one polybutylene glycol having a cap of a fluorinated alkyl group on at least one end thereof wherein said lubricant has a molecular weight between about 300 and about 4,000, and has a viscosity of about 5 to about 150 centistokes at 37° C.

2. The composition of claim 1 wherein said refrigerant is a hydrofluorocarbon.

3. The composition of claim 2 wherein said hydrofluorocarbon is tetrafluoroethane.

4. The composition of claim 3 wherein said tetrafluoroethane is 1,1,1,2-tetrafluoroethane.

5. The composition of claim 1 wherein said component (b) additionally contains polypropylene glycol.

6. The composition of claim 5 wherein said polypropylene glycol has a cap of a fluorinated alkyl group on at least one end thereof.

7. The composition of claim 1 wherein said polybutylene glycol has the formula $$R_1OR_2[C_4H_8O]_m[C_3H_6O]_nR_3$$

wherein m is 4 to 36, n is 0 to 36, $R_2$ is $-C_pH_{2p}O-$ wherein p is 0 to 4, and $R_1$ and $R_3$ are independently selected from the group consisting of hydrogen, alkyl group, and fluorinated alkyl group wherein the ratio of m to n is at least 2.

8. The composition of claim 7 wherein said composition additionally comprises a non-fluorinated lubricant.

9. The composition of claim 8 wherein said composition additionally comprises mineral oil.

10. The composition of claim 8 wherein said composition additionally comprises alkyl benzene.

11. The composition of claim 8 wherein said composition additionally comprises an ester.

12. A lubricating composition comprising a polyoxyalkylene glycol having a cap of a fluorinated alkyl group on at least one end thereof wherein said polyoxyalkylene glycol is formed from copolymer of propylene oxide and butylene oxide and said composition has a molecular weight between about 300 and about 4,000, and a viscosity of about 5 to about 150 centistokes at 37° C., and is miscible with a refrigerant selected from the group consisting of hydrofluorocarbon, hydrochlorofluorocarbon, fluorocarbon, and chlorofluorocarbon.

13. A method for improving lubrication in compression refrigeration and air-conditioning equipment using a refrigerant selected from the group consisting of hydrofluorocarbon, hydrochlorofluorocarbon, fluorocarbon, and chlorofluorocarbon comprising the step of:
employing a sufficient amount to provide lubrication of at least one polybutylene glycol having a cap of a fluorinated alkyl group on at least one end thereof wherein said lubricant has a molecular weight between about 300 and about 4,000, has a viscosity of about 5 to about 150 centistokes at 37° C., and is miscible in combination with said refrigerant in the range between −40° C. and at least +20° C.

14. The method of claim 13 wherein said refrigerant is a hydrofluorocarbon.

15. The method of claim 14 wherein said hydrofluorocarbon is tetrafluoroethane.

16. The method of claim 15 wherein said tetrafluoroethane is 1,1,1,2-tetrafluoroethane.

17. The method of claim 13 wherein said method additionally employs polypropylene glycol.

18. The method of claim 13 wherein said polybutylene glycol has the formula $$R_1OR_2[C_4H_8O]_m[C_3H_6O]_nR_3$$

wherein m is 4 to 36, n is 0 to 36, $R_2$ is $-C_pH_{2p}O-$ wherein p is 0 to 4, and $R_1$ and $R_3$ are independently selected from the group consisting of hydrogen, alkyl group, and fluorinated alkyl group wherein the ratio of m to n is at least 2.

19. A composition for use in compression refrigeration and air-conditioning comprising:
(a) at least one refrigerant selected from the group consisting of hydrofluorocarbon, hydrochlorofluorocarbon, fluorocarbon, and chlorofluorocarbon;
(b) a sufficient amount to provide lubrication of at least one polybutylene glycol wherein said lubricant has a molecular weight of about 300 to about 4,000 and has a viscosity of about 5 to about 150 centistokes at 37° C.; and
(c) a non-fluorinated lubricant selected from the group consisting of mineral oil and alkyl benzene 20. The composition of claim 19 wherein said polybutylene glycol has a cap of a fluorinated group on at least one end thereof.

21. The composition of claim 19 which additionally contains polypropylene glycol.

22. The composition of claim 19 which additionally contains polypropylene glycol having a cap of a fluorinated alkyl group on at least one end thereof.

* * * * *